(12) United States Patent
Kawai (10) Patent No.: US 7,121,614 B2
(45) Date of Patent: Oct. 17, 2006

(54) AIR DEFLECTOR

(75) Inventor: Kazuo Kawai, Kanagawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 11/148,173

(22) Filed: Jun. 9, 2005

(65) Prior Publication Data

US 2005/0281042 A1    Dec. 22, 2005

(30) Foreign Application Priority Data

Jun. 21, 2004  (JP) .............................. 2004-182080

(51) Int. Cl.
*B62D 35/00* (2006.01)
(52) U.S. Cl. ................... 296/180.2; 296/180.3
(58) Field of Classification Search ............. 296/180.2, 296/180.3; D12/181
See application file for complete search history.

(56) References Cited

U.S. PATENT DOCUMENTS

| 3,972,556 | A | * | 8/1976 | Mason, Jr ................. 296/180.2 |
| 4,036,519 | A | * | 7/1977 | Servais et al. ............ 296/180.2 |
| 4,611,796 | A | * | 9/1986 | Orr ......................... 296/180.2 |
| 4,919,472 | A | * | 4/1990 | Wiley, Jr. ................. 296/180.2 |
| 5,094,503 | A | * | 3/1992 | Dare-Bryan .............. 296/180.2 |
| 5,130,906 | A | * | 7/1992 | Lund ......................... 296/95.1 |
| 5,249,837 | A | * | 10/1993 | Luttrell .................... 296/180.3 |
| D343,819 | S | * | 2/1994 | Meryman et al. .......... D12/181 |
| 5,836,640 | A | * | 11/1998 | Hurayt et al. ............. 296/180.2 |
| 6,099,069 | A | * | 8/2000 | Spears ..................... 296/180.2 |
| 6,585,312 | B1 | * | 7/2003 | Jain ......................... 296/180.2 |

FOREIGN PATENT DOCUMENTS

| JP |    2547461 | 1/1997 |
| JP | 11-115828  | 4/1999 |
| JP |    3309603 | 5/2002 |

\* cited by examiner

*Primary Examiner*—Jason Morrow
(74) *Attorney, Agent, or Firm*—Staas & Halsey LLP

(57) ABSTRACT

An air deflector (10) is attached to a roof of a cab (2). A rear edge portion (12) of the air deflector has a configuration identical with an upper part of a vertical front face (4) of a van body (3) or a configuration closely resembling the upper part thereof, as viewed from the front. A marker lamp (40) is located on a ridge portion (32) of the air deflector in proximity to the rear edge portion. An upper surface (41) and a side surface (43) of the marker lamp are formed to continue an upper face (31) and a side face (33) of the air deflector, and a ridge portion (42) of the marker lamp is in alignment with the ridge portion of the air deflector. The air deflector can ensure visibility of the marker lamps, while preventing the flow of air from impinging on the upper corner areas of the front face of the van body, whereby the aerodynamic performance of the vehicle is improved.

12 Claims, 7 Drawing Sheets

AIR DEFLECTOR

FIELD OF THE INVENTION

The present invention relates to an air deflector for a vehicle, and more specifically, to such an air deflector which can eliminate a stepped formation between a cab and a van body of a cab-over-engine truck for reduction of air resistance acting on the vehicle during driving.

BACKGROUND OF THE INVENTION

A cab style of a cab-over-engine truck affects automobile performances, such as a fuel consumption ratio. From an aspect of improvement of aerodynamic characteristics in a driving condition of the vehicle, various kinds of researches or studies have been carried out for long years, with respect to configurations of cabs or flush surface contours of vehicle bodies for reducing the air resistance, devices for reducing the air resistance, or the like. An excessively angled or inclined front-windshield results in reduction of an internal space of the cab, and therefore, in this kind of researches or studies, attempts have been made to improve the aerodynamic characteristics, based on square configurations of the cab.

An air deflector is known in the art, as a device reducing the air resistance for improving the aerodynamic characteristics of the vehicle in its driving condition. Such an air deflector is also called, a wind deflector or a drag-foiler. This kind of air deflector is disclosed in, for instance, Japanese patent laid-open publication No. 11-115828, Japanese patent publication No. 3309603, or Japanese utility-model publication No. 2547461. As disclosed in these publications, the air deflector is attached onto a roof of a cab of a cab-over-engine truck so as to reduce the air resistance during driving for improving its aerodynamic characteristics.

Figure 8A:
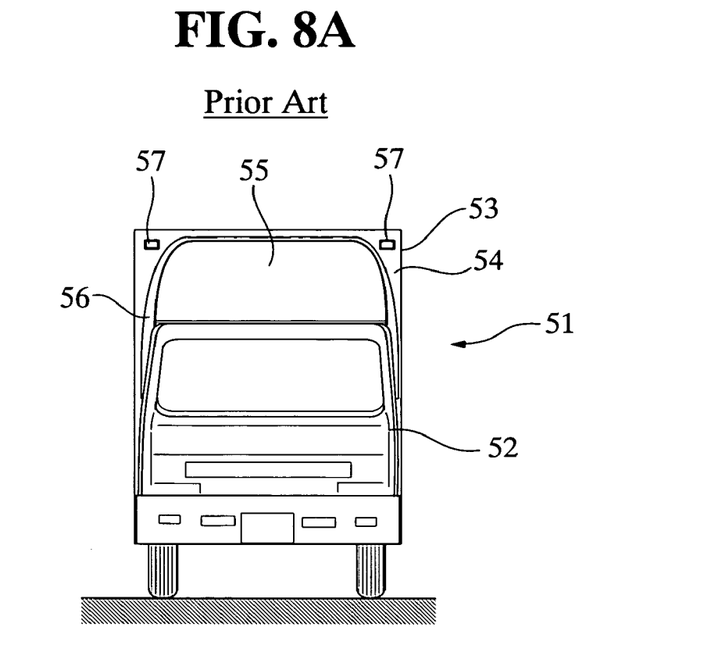
FIGS. 8A and 8B are a front elevational view and a partial side elevational view, respectively, schematically illustrating an arrangement of a cab-over-engine truck provided with a conventional air deflector.
Figure 8B:
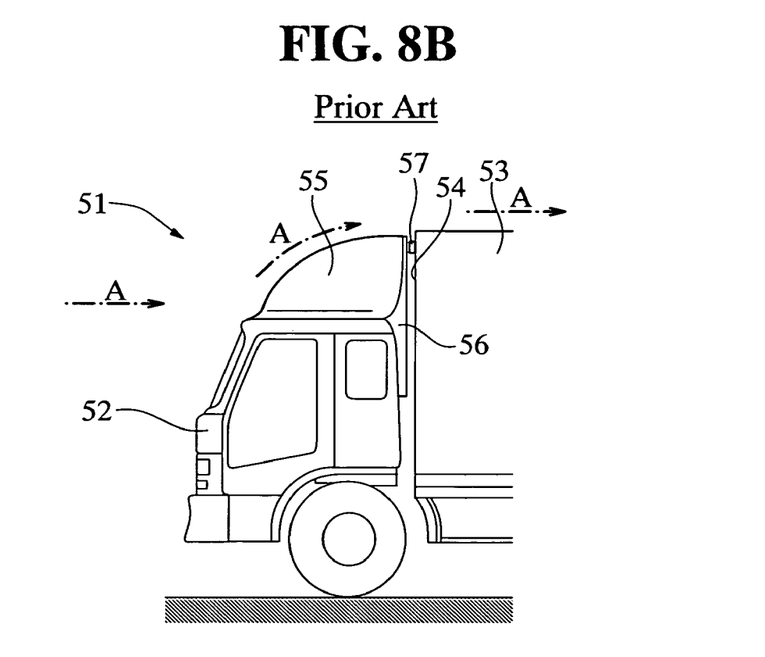

FIGS. 8A and 8B are a front elevational view and a partial side elevational view exemplifying an arrangement of a cab-over-engine truck provided with a conventional air deflector.

As shown in FIGS. 8A and 8B, a truck 51 is provided with an air deflector 55 and a gap sealing member 56. The air deflector 55 is mounted on a roof of the cab 52. The gap sealing member 56 is arranged to close a gap formed between a cab 52 and a van body 53. The air deflector 55 eliminates a stepped formation or a difference in level between the roof of the cab 52 and a vertical front face 54 of the van body 53, so that a flow of air, as indicated by an arrow A, is regulated and smoothly deflected by the air deflector 55. In a driving condition of the vehicle, the flow of air A is directed from a front face of the cab 52 along top and side faces of the van body 53 toward the rear of the vehicle. Further, the gap sealing member 56 eliminates the gap and a stepped formation between side faces of the cab 52 and the front face 54 to some extent. Similarly to the air deflector 55, the member 56 also causes the flow of air A to be regulated and smoothly deflected, so that the flow A is directed along the side faces of the van body 53. In the cab-over-engine truck provided with the air deflector 55 and the gap sealing member 56, effects of regulation and deflection of the airflow A are to be obtained by the air deflector 55 and the member 56, and therefore, the air resistance acting on the vehicle in its driving condition can be reduced. In general, it is considered that improvement of the aerodynamic characteristics by the air deflector 55 and the member 56 allows the fuel consumption ratio to be reduced by a few per cent.

However, right and left marker lamps 57 in a pair are installed on upper corners of the vertical front face 54, in a case of a vehicle provided with a box-type van body, such as a dry van body or wing body. The marker lamp 57 is mainly intended to function as a target or indication for recognizing positional relation between oncoming vehicles. Therefore, the devices for reducing the air resistance, such as the air deflector 55 and the gap sealing member 56, have to be designed to ensure visibility of the marker lamps 57, and the positions and configurations of such devices should be so set as to prevent the markers from being concealed. That is, the device for reducing the air resistance, such as the air deflector, cannot conceal the upper corner areas of the front face 54 against the flow of air A, but it can be merely designed to cover the upper part of the front face 54 except for the corner areas. Therefore, the flow of air A impinges on the corner areas of the front face 54 during driving, so that abrupt direction change or turbulence of the airflow A is caused. This results in increase of the air resistance and inferiority of the aerodynamic performance of the vehicle.

SUMMARY OF THE INVENTION

It is therefore an object of the present invention to provide an air deflector which can ensure visibility of the marker lamps and which can prevent the flow of air from impinging on the upper corner areas of the vertical front face of the van body, thereby improving the aerodynamic performance of the vehicle.

The object is accomplished by an air deflector, which is attached to a vehicle provided with a cab and a van body in a form of box and which is mounted on a roof of the cab so as to improve an aerodynamic performance of the vehicle, comprising;

a marker lamp located in proximity to a rear edge portion of the air deflector opposed against a vertical front face of the van body, wherein the marker lamp is positioned on a ridge portion connecting a side face of the air deflector and a frontward inclined upper face thereof.

According to the arrangement of this invention, the marker lamp is installed on the air deflector, rather than the vertical front face of the van body. The upper surface of the air deflector is inclined or angled frontward, and the rear edge portion of the air deflector is opposed against the vertical front face of the van body. The marker lamp is disposed on the ridge portion of the air deflector in proximity to the rear edge portion. Therefore, the marker lamp can be visually recognized or confirmed from the front, the above and the side of the vehicle. The marker lamp comes into sight at an angle to the front or slightly downward in the eyes of a driver of a vehicle passing an opposite lane, in a case where the vehicle in the opposite lane has a height equal to or higher than that of the vehicle with the air deflector. The marker lamp comes into sight at an angle to the front and slightly upward in the eyes of a driver of a vehicle passing an opposite lane, in a case where the vehicle in the opposite lane has a height lower than that of the vehicle with the air deflector.

Provision of the marker lamp on the air deflector allows the upper corner areas of the front face of the van body to be covered with the air deflector, and therefore, these corner areas can be shielded with the air deflector against the flow of air during driving. The flow of air regulated by the air deflector is directed to the rear of the vehicle without impinging on the corner areas of the front face of the van body, whereby the aerodynamic performance of the vehicle is improved.

Preferably, an upper surface of the marker lamp is formed to be substantially flush with the upper face of the air deflector, so that a continuous upper surface of the air deflector is formed; a side surface of the marker lamp is formed to be substantially flush with the side face of the air deflector, so that a continuous side surface of the air deflector is formed; and a ridge portion joining the upper and side surfaces of the marker lamp is substantially in alignment with the ridge portion of the air deflector, so that a continuous ridge is formed. Since the upper surface, side surface and ridge portion of the marker lamp are substantially flush or aligned with the upper surface, side surface and ridge portion of the air deflector respectively, the flush surface configuration overall the air deflector can be ensured, and therefore, the marker lamp can be installed on the air deflector without deteriorating the performance of the air deflector regulating the airflow and reducing the air resistance. More preferably, the upper and side surfaces of the marker lamp are configured to enlarge rearward along the ridge portion of the air deflector.

The rear edge portion of the air deflector may have a configuration identical with the front face of the van body or a configuration closely resembling the front face, as viewed from the front. The width (W3) and the height (H2) of the rear edge portion of the air deflector may be set to be substantially equal to the width (W1) and the height (H1) of the front face of the van body, respectively. The upper part of said front face of the van body is substantially fully covered with the air deflector, as viewed from the front, whereby a stepped formation is substantially completely eliminated between the air deflector and the van body.

Alternatively, the surface of the air deflector may be configured to direct the flow of air outward of the top and side edges of the front face of the van body. At least one of the width (W3) and the height (H2) of the rear edge portion of the air deflector may be less than the width (W1) or the height (H1) of the front face of the van body, wherein an extension line (E) of the rear edge portion intersects the edge of the front face, or extends outward thereof.

Preferably, the air deflector has a base part mounted on the roof of the cab, an upper panel attached onto the base part, and angle adjusting means for adjusting an angle of the upper panel with respect to the base part. The angle adjusting means includes a pivot joint which pivotally supports the upper panel for rotation about a horizontal axis, and a locking mechanism which engages with the upper panel so as to secure the panel in a desired level. The base part has a supporting section for supporting the upper panel, and a boundary between the supporting section and the front and side faces of the base part is formed by a stepped edge. Inside of the boundary, the supporting section is recessed by the stepped edge, and the upper panel is attached to the supporting section so that a surface of the upper panel is substantially flush with a surface of the base part.

The upper panel has a marker lamp mount section on its ridge portion, and the marker lamp is positioned in a cavity or recess of the marker lamp mount section. A lens of the marker lamp has an outer edge profile matching with a frame of the mount section, and an outer peripheral edge of the lens is fixed to the frame.

DETAILED DESCRIPTION OF THE INVENTION

With reference to the attached drawings, a preferred embodiment of the present invention is described hereinafter.

Figure 1A:
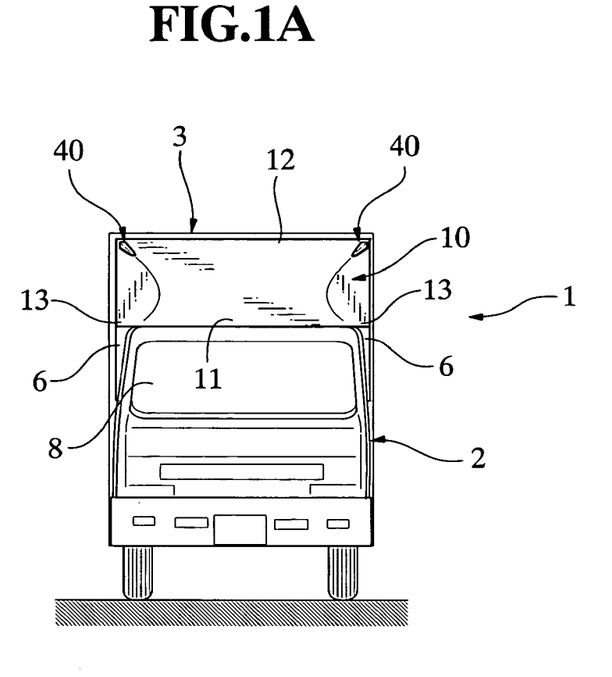
FIGS. 1A and 1B are a front elevational view and a partial side elevational view schematically illustrating an arrangement of a cab-over-engine truck provided with an air deflector according to the present invention.
Figure 1B:
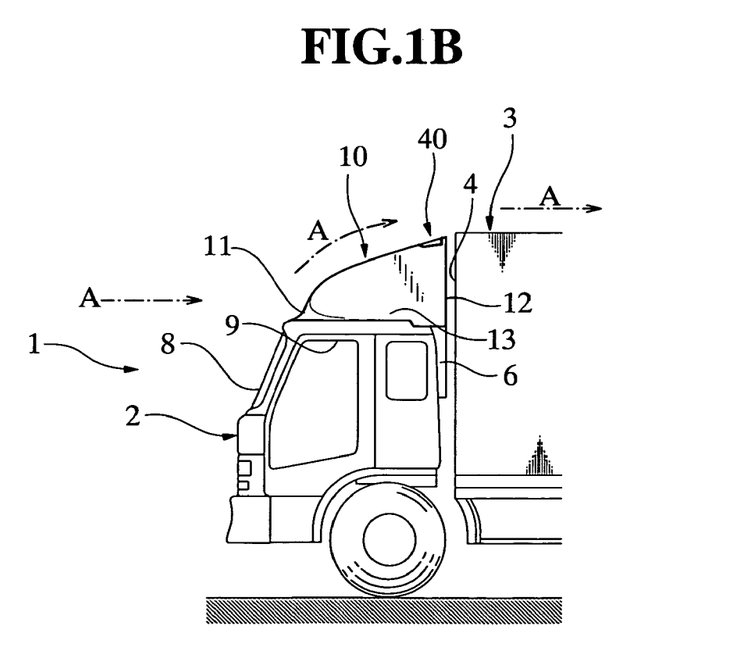

FIGS. 1A and 1B are a front elevational view and a partial side elevational view generally illustrating an arrangement of a relatively large-sized cab-over-engine truck provided with an air deflector according to the present invention.

The vehicle 1 as shown in FIGS. 1A and 1B is a cab-over-engine truck which comprises a cab or cabin 2 and a van body 3. An internal combustion engine (not shown) is located beneath the cab 2, and the van body 3 is carried by a chassis frame. An air deflector 10 is attached to a roof panel of the cab 2 so that the whole roof of the cab 2 is covered with the air deflector 10.

A front edge portion 11 of the air deflector 10 is positioned on an upper frame portion of a front-windshield 8. Side edge portions 13 of the air deflector 10 extend rearward along upper frame portions of openings 9 for outwardly swinging doors (not shown). Each of the side edge portions 13 protrudes rearward from the cab 2 to such an extent that the side edge portion 13 comes close to a vertical front face 4 of the van body 3. A gap sealing member 6 is disposed on the cab 2 along a rear end of its side face, so that the member 6 partially occupies a space beneath the air deflector 10 between the cab 2 and the van body 3.

A rear end face of the air deflector 10 opens, opposing against the front face 4 of the van body 3. A rear edge portion 12 of the air deflector 10 linearly extends along a top edge and side edges of the front face 4. As viewed from the front, the rear edge portion 12 differs from the conventional air deflector (shown in FIG. 8) in that, a configuration or profile of the air deflector 10 conforms to a configuration or profile of an upper part of the front face 4; or otherwise, the configuration or profile of the air deflector 10 is approximate or analogous to the configuration or profile of the front face 4 and slightly smaller than that of the front face 4.

As shown in FIG. 1A, the upper part of the front face 4, which upwardly protrudes from the cab 2, is substantially fully covered with the air deflector 10, as viewed from the front. Therefore, upper corner areas of the front face 4 exposed to the front do not exist, on which the flow of air might otherwise impinge during driving, and stepped formations are substantially completely eliminated between the air deflector 10 and the van body 3. The air deflector 10 has a wind fairing configuration enlarged rearward, which regulates and smoothly deflects the flow of air along the roofs of the cab 2 and the body 3 during driving, as illustrated by wind flow arrows A in FIG. 1B.

Figure 2:
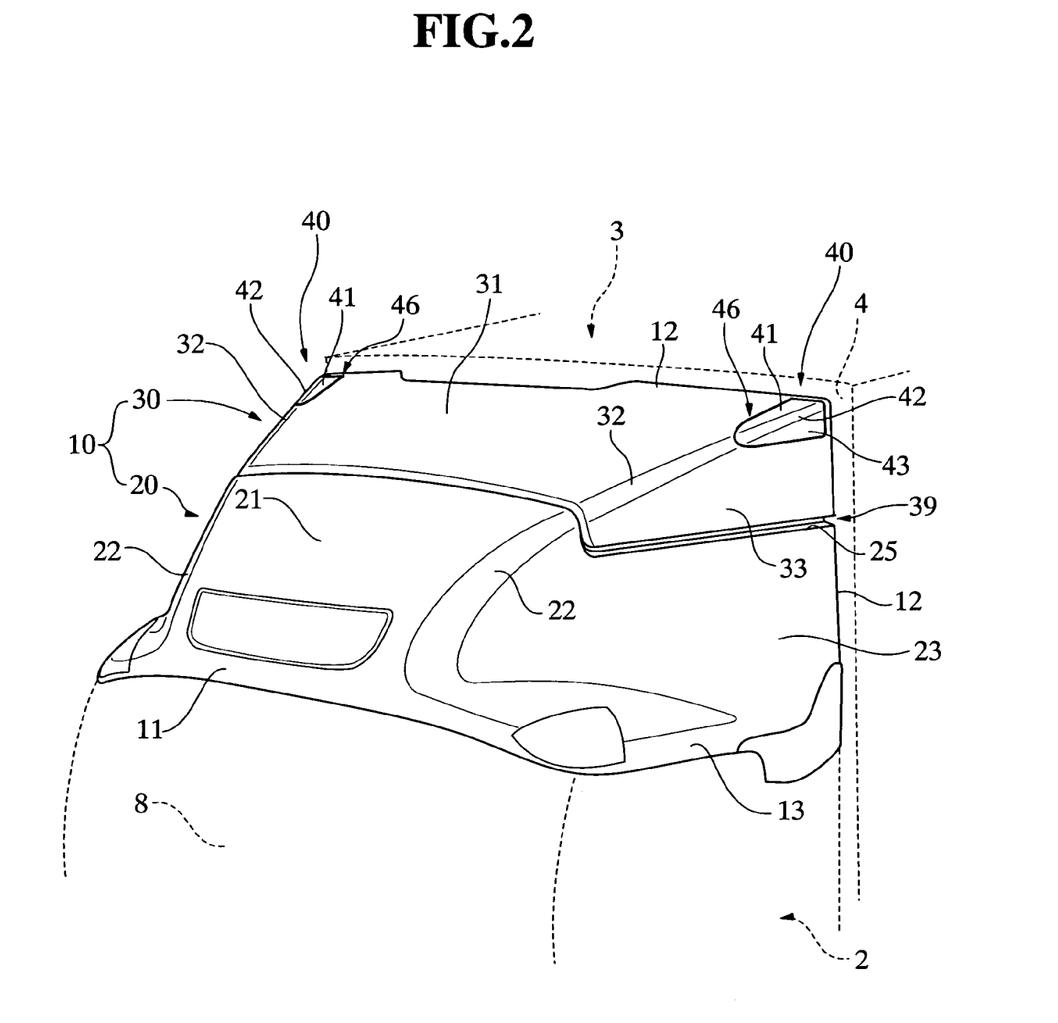
FIG. 2 is an enlarged perspective view of the air deflector as shown in FIG. 1.
Figure 3:
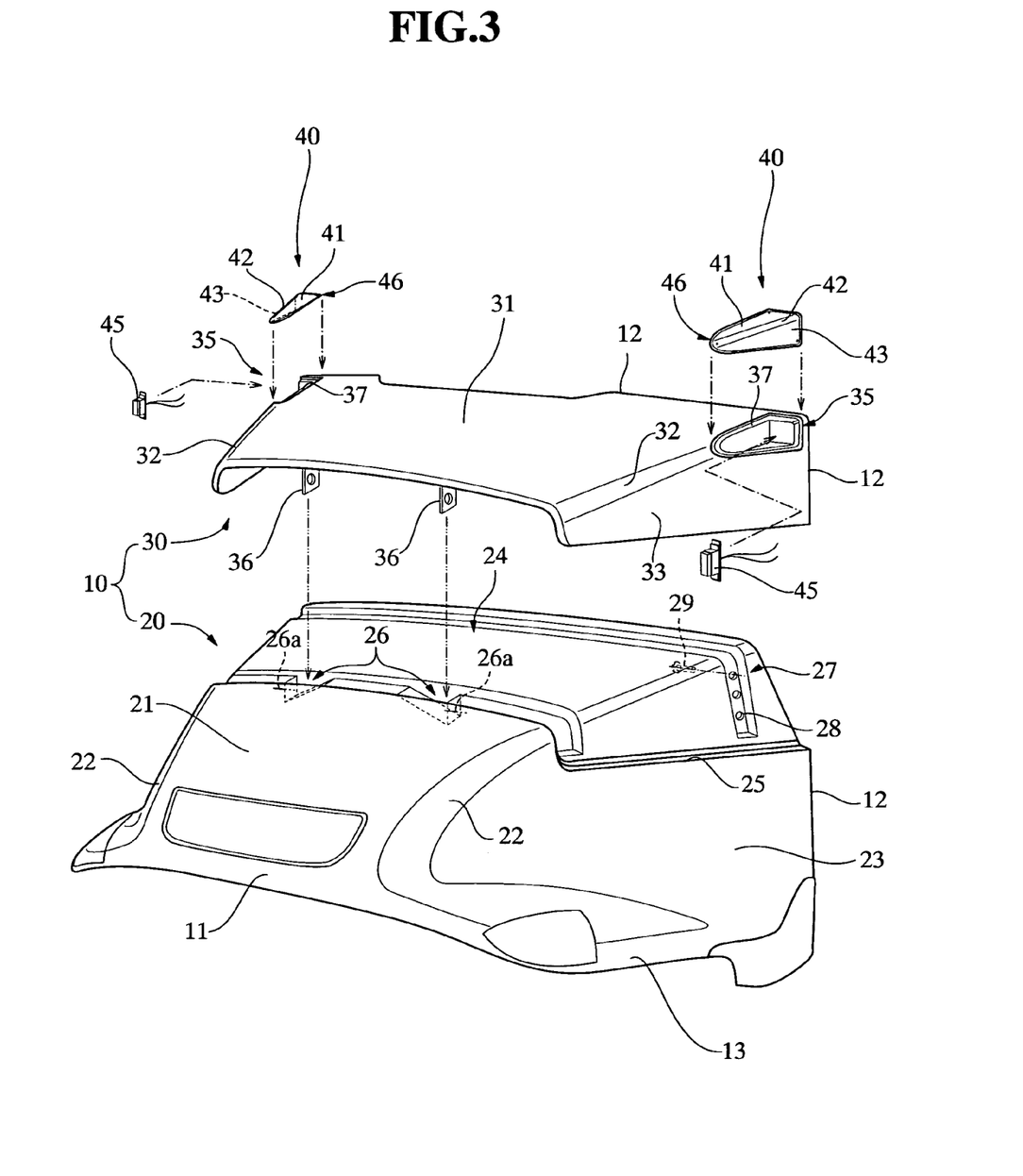
FIG. 3 is an exploded perspective view of the air deflector as shown in FIG. 2.

FIG. 2 is an enlarged perspective view showing the air deflector 10, and FIG. 3 is an exploded perspective view of the air deflector 10 as shown in FIG. 2.

The air deflector 10 comprises a base part 20 mounted on the roof panel and an upper panel 30 attached onto the base part 20, and an angle of the upper panel 30 is adjustable with respect to the base part 20. Right and left marker lamps 40 in a pair are located on a ridge portion 32 of the panel 30.

As shown in FIG. 3, the base part 20 has an inclined face 21 extending rearward and upward from the front edge portion 11; right and left side faces 23 connecting with the inclined face 21 at the ridge portion 22; and a supporting section 24 supporting the upper panel 30, wherein an angle of the panel 30 relative to the section 24 is adjustable. A boundary between the supporting section 24 and the faces 21, 23 is formed by a stepped edge 25. Inside of the boundary, the supporting section 24 is generally recessed by the stepped edge 25. Therefore, the upper panel 30 is attached to the supporting section 24 so that the surface of the upper panel 30 can be flush with the surface of the base part 20. The supporting section 24 is provided with a pair of right and left pivot joints 26 which pivotally supports brackets 36 of the panel 30 about axes 26a, and a pair of right and left locking mechanisms 27 which can engage with side faces 33 of the panel 30 so as to selectively secure the panel 30 in a desired level. The locking mechanism 27 includes a plurality of holes 28 vertically aligned with each other, and a locking element 29 for securing the side face 33 can be selectively inserted through one of the holes 28.

The upper panel 30 has an inclined face 31 in its center zone, the aforementioned side faces 33 connecting with the inclined face 31 at the ridge portion 32, and a pair of marker lamp mount sections 35 to which marker lamps 40 are attached. The aforementioned brackets 36 depend from an underside of the front edge portion of the face 31, and each of the brackets 36 is formed with a circular hole, through which a horizontal shaft (the axis 26a) of the pivot joint 26 is inserted. As set forth above, the locking element 29, such as a bolt, is selectively inserted through one of the holes 28, so that the side faces 33 of the upper panel 30 is fixed on the base part 20 by the element 29. Thus, the upper panel 30 is attached to the base part 20 as shown in FIG. 2, and the angle of the upper panel 30 relative to the base part 20 can be set to be a desired angle by the pivot joints 26 and the locking mechanisms 27.

As shown in FIG. 2, a seam 39 may be formed at the stepped edge 25 so as to extend along the front and side edges of the upper panel 30, but the inclined face 31, the ridge portion 32 and the side faces 33 substantially continuously connect with the inclined face 21, the ridge portions 22 and the side faces 23. Therefore, the air deflector 10 forms a substantially single wind fairing surface over the roof of the cab 2, which continuously extends from the front edge portion 11 to the rear edge portion 12.

The marker lamps 40 are respectively positioned on the right and left ridge portions 32 in close proximity to the rear edge portion 12. The frontward inclination of the ridge portion 32 allows the marker lamps 40 to be viewed from the front of the vehicle.

As shown in FIG. 3, the marker lamp 40 is provided with an LED lamp 45 and a front lens 46. The lamp 45 is positioned in a cavity or recess of the marker lamp mount section 35 formed on the ridge portion 32. The mount section 35 is configured to enlarge rearward. The lamp 45 is attached in a predetermined position associated with a reflector (not shown) provided in the mount section 35. Electric lead wires of the lamp 45 are coupled with electric feeders wired in the base part 20. The lens 46 is formed by a synthetic resin mold having an L-shaped cross-section. If desired, a number of small-sized convex lenses (not shown) are formed on an inside surface of the lens 46. The lens 46 has an outer edge profile matching with a frame 37 of the mount section 35, and an outer peripheral edge of the lens 46 is fixed to the frame 37 by fixing elements, such as screws (not shown).

Figure 4:
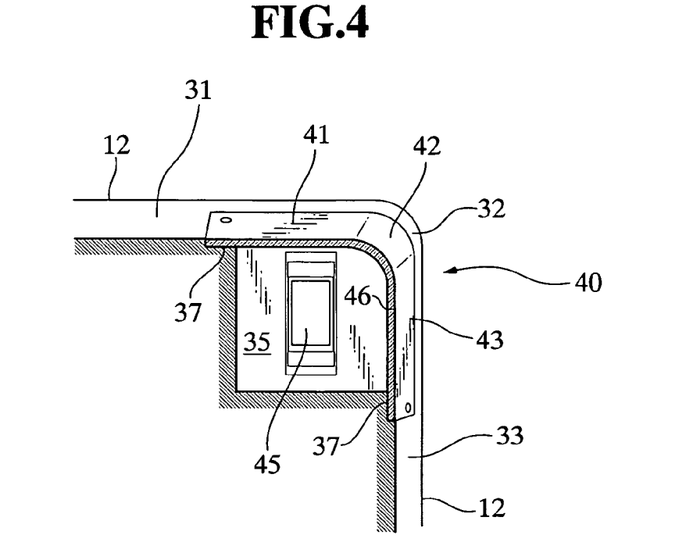
FIG. 4 is a vertical cross-sectional view illustrating a cross-sectional structure of a maker lamp as shown in FIG. 2.

FIG. 4 is a vertical cross-sectional view illustrating a cross-sectional structure of the marker lamp 40 assembled to the mount section 35.

A ridge portion 42 of the lens 46 is bent to be in alignment with the ridge portion 32. An upper surface 41 of the lens 46 is connected to the inclined face 31 so that the surface 41 is flush with the face 31, and a side surface 43 of the lens 46 is connected to the side face 33 so that the surface 43 is flush with the face 33. The upper and side surfaces 41, 43 are configured to enlarge rearward along the ridge portion 42. If desired, an outer periphery of the lens 46 is provided with sealing means. The marker lamp 40 thus constructed can be visually recognized not only from the front of the vehicle as previously described, but also from the above or the side of the vehicle as well.

Figure 5:
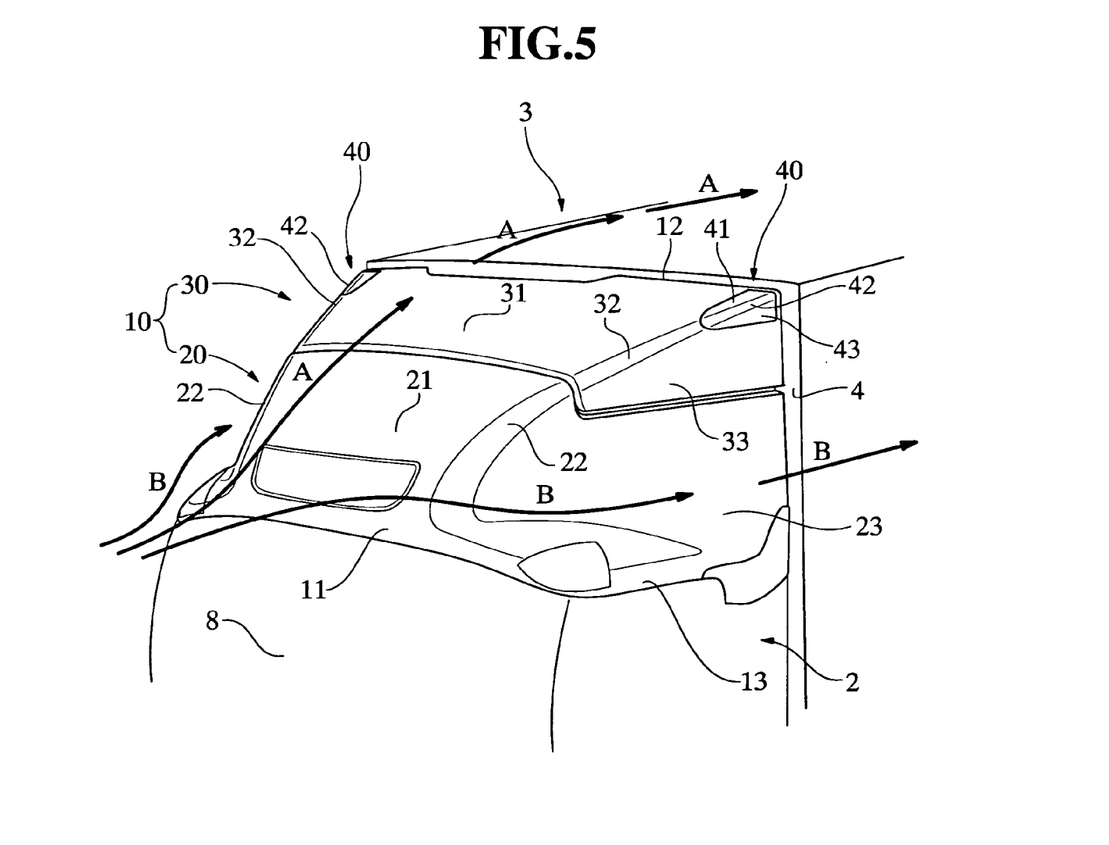
FIG. 5 is a perspective view showing a wind fairing effect of the air deflector.
Figure 6A:
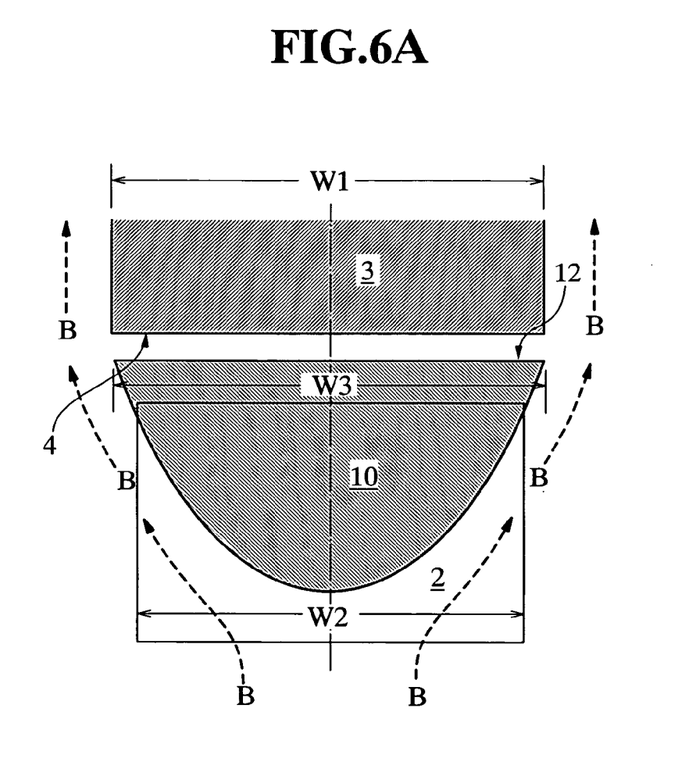
FIGS. 6A and 6B are a plan view and a side elevational view schematically showing a geometrical relation between the air deflector and a vertical front face of a van body.
Figure 6B:
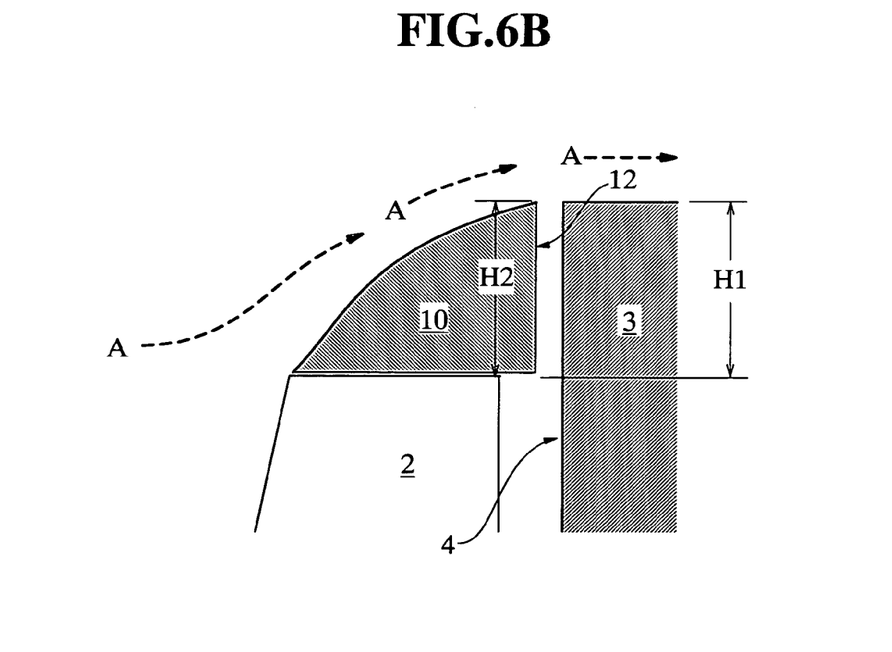

FIG. 5 is a perspective view showing a wind fairing effect of the air deflector 10. FIGS. 6A and 6B are a plan view and a side elevational view schematically showing a geometrical relation between the air deflector 10 and the vertical front face 4 of the van body 3.

As shown in FIG. 5, the air deflector 10 assembled from the base part 20, the upper panel 30 and the marker lamps 40 is mounted on the cab 2, and the upper part of the front face 4 of the van body 3 is substantially fully covered with the air deflector 10. The flow of air A is smoothly deflected upward along the gently slanted surfaces 21, 31, and a part of the airflow is smoothly deflected toward the side of the vehicle along the side faces 23, 33, as indicated by the flow of air B. As regards a cab-over-engine truck having the air deflector 10 with such an arrangement, the present inventor has conducted experiments with respect to the coefficient of drag (CD) which represents the air resistance. As the results of the experiments, it has been found that the coefficient of drag (CD) as for the truck with the deflector 10 is improved by approximately 3 to 4%, in comparison with the results (CD) of similar experiments as for a truck with a conventional air deflector in which spaces for the marker lamps are provided at the upper corners of the front face 4.

The marker lamp 40, which is located on the ridge portion 32 in proximity to the rear edge 12 of the air deflector 10, can be viewed from the above, side and front of the vehicle 1. Therefore, a driver in a vehicle of a similar class or similar size can visually recognize the marker lamp 40 from the front at an oblique angle in the substantially same level, when driving the vehicle in an opposite lane. The driver of a vehicle in the opposite lane can visually recognize the marker lamp 40 by looking above or down at the lamp 40, even though the height of the vehicle considerably differs from that of the vehicle 1 with the air deflector 10.

FIG. 6A is a plan view schematically showing a geometrical relation between the air deflector 10 and the front face 4 as shown in FIGS. 1 through 5. In FIG. 6A, the width W1 of the front face 4 and the width W2 of the cab 2 are illustrated. Usually, the width W1 of the front face 4 is set to be greater than the width W2 of the cab 2, and therefore, the difference between the width W1 and the width W2 may result in a stepped formation between the cab 2 and the van body 3. In a vehicle without an air deflector, a part of the front face 4 exposed to the front of the vehicle is made by such a stepped formation (W1-W2). This causes the aerodynamic characteristics of the vehicle to be inferior.

In this embodiment, the width W3 of the rear edge portion 12 of the air deflector 10 is set to be substantially the same as the width W1 of the front face 4, or slightly smaller than the width W1.

FIG. 6B is a side elevational view showing a geometrical relation between the air deflector 10 and the front face 4. A part of the front face 4 upwardly protruding from the roof of the cab 2 is indicated by a dimension H1. This part provides a stepped formation between the cab 2 and the van body 3. In a vehicle without an air deflector, such a part of the front face 4 is exposed to the front of the vehicle by such a stepped formation (H1). This causes the aerodynamic characteristics of the vehicle to be inferior.

In this embodiment, the height H2 of the rear edge portion 12 of the air deflector 10 is set to be substantially the same as the height H1 of the front face 4, or slightly smaller than the height H1.

As shown in FIG. 6B, the flow of air A is smoothly deflected upward along the surface of the air deflector 10, and a part of the airflow is smoothly deflected toward the sides of the vehicle 1, as shown by the flow of air B indicated in FIG. 6A. In addition, the upper corners of the front face 4 is covered with the air deflector 10, so that the flows of air A, B do not impinge on the upper corners of the front face 4, and therefore, the air resistance during driving is reduced.

Figure 7A:
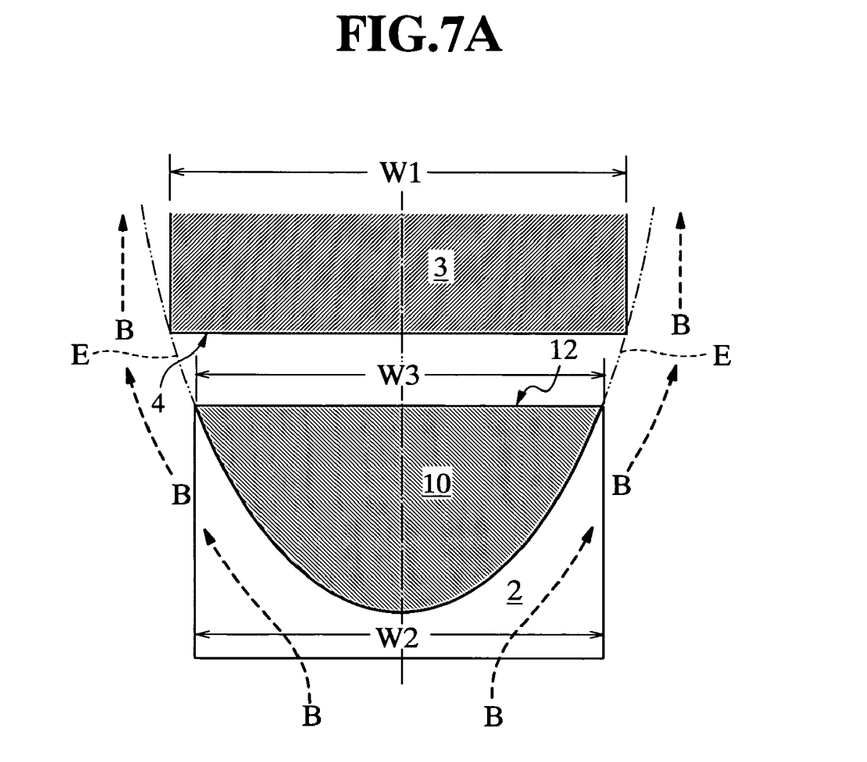
FIGS. 7A and 7B are a plan view and a side elevational view schematically showing a geometrical relation between an alternative air deflector and a vertical front face of a van body.
Figure 7B:
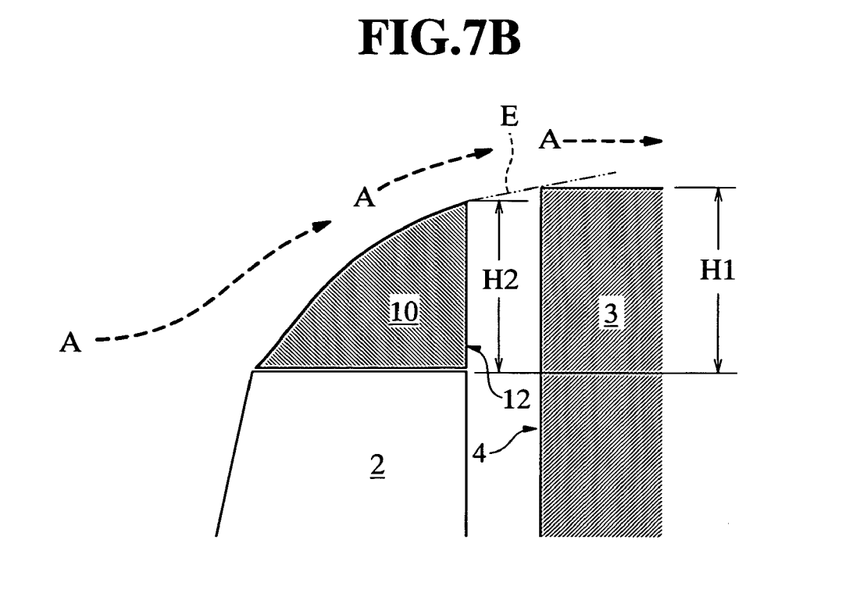

FIGS. 7A and 7B are a plan view and a side elevational view schematically showing another geometrical relation between an alternative air deflector 10 and the vertical front face 4.

As shown in FIGS. 7A and 7B, the rear edge portion 12 of the air deflector 10 may be positioned in vertically alignment with a vertical plane of the rear face of the cab 2, and extension lines (phantom lines) E of the surfaces of the air deflector 10 intersect the top and side edges of the front face 4, or the lines E extend outside of these edges of the front face 4. The flows of air A, B are smoothly deflected upward and sideways along the surfaces of the air deflector 10. As the flows of air A, B are directed upward and sideways by velocity components acting to diverge the airflow outward, the airflow is directed over the top and side edges of the front face 4 without impinging on the front face 4.

Although the present invention has been described as to a preferred embodiments, the present invention is not limited thereto, but may be carried out in any of various modifications or variations without departing from the scope of the invention as defined in the accompanying claims.

For example, the air deflector may be combined with a side deflector.

Further, the surface of the marker lamp is not limited to combination of the flat surfaces (upper surface and side surfaces) and the ridge portion, but it may be a curved surface or an irregular surface.

INDUSTRIAL APPLICABILITY

The present invention can be applied to an air deflector for a vehicle, especially, a cab-over-engine truck. The air deflector is arranged to eliminate the stepped formation between the cab and the van body of the vehicle, so as to reduce the air resistance acting on the vehicle during driving. According to the air deflector of the present invention, the marker lamp is provided on the air deflector so that the upper corner areas of the vertical front face of the van body are covered or shielded with the air deflector against the flow of air in a driving condition, and therefore, the air deflector can ensure visibility of the marker lamps, while preventing the flow of air from impinging on the upper corner areas of the vertical front face of the van body, so as to improve the aerodynamic performance of the vehicle.

What is claimed is:

1. An air deflector, which is attached to a vehicle provided with a cab and a van body in a form of box and which is mounted on a roof of the cab so as to improve an aerodynamic performance of the vehicle, comprising;
   a marker lamp located in proximity to a rear edge portion of the air deflector opposed against a vertical front face of the van body, wherein the marker lamp is positioned on a ridge portion connecting a side face of the air deflector and a frontward inclined upper face thereof.

2. An air deflector as defined in claim 1, wherein an upper surface of said marker lamp is formed to be substantially flush with said upper face of the air deflector, so that a continuous upper surface of the air deflector is formed; a side surface of the marker lamp is formed to be substantially flush with said side face of the air deflector, so that a continuous side surface of the air deflector is formed; and a ridge portion joining the upper and side surfaces of the marker lamp is in alignment with the ridge portion of the air deflector so as to form a continuous ridge of the air deflector.

3. An air deflector as defined in claim 1, wherein said rear edge portion of the air deflector has a configuration identical with said front face of the van body or a configuration closely resembling the front face, as viewed from the front of the vehicle.

4. An air deflector as defined in claim 1, wherein a surface of the air deflector is configured to direct the flow of air outward of top and side edges of said vertical front face of the van body.

5. An air deflector as defined in claim 3, wherein a width (W3) and a height (H2) of said rear edge portion of the air deflector is set to be substantially equal to a width (W1) and a height (H1) of an upper part of said front face, respectively.

6. An air deflector as defined in claim 4, wherein at least one of a width (W3) and a height (H2) of the rear edge portion is set to be less than a width (W1) or a height (H1) of an upper part of said front face, wherein an extension line (E) of the rear edge intersects the edge of the vertical front face of the van body, or extends outward thereof.

7. An air deflector as defined in claim 2, wherein said upper and side surfaces of the marker lamp are configured to enlarge rearward along said ridge portion of the air deflector.

8. An air deflector as defined in claim 1, wherein the air deflector has a base part mounted on the roof of the cab, an upper panel attached onto the base part, and angle adjusting means for adjusting an angle of the upper panel with respect to the base part.

9. An air deflector as defined in claim 8, wherein said angle adjusting means includes a pivot joint which pivotally supports said upper panel for rotation about a horizontal axis, and a locking mechanism which engages with the upper panel so as to secure the panel in a desired level.

10. An air deflector as defined in claim 8, wherein the base part has a supporting section for supporting the upper panel, and a boundary between the supporting section and the front and side faces of said base part is formed by a stepped edge; and wherein, inside of the boundary, the supporting section is recessed by the stepped edge, and the upper panel is attached to the supporting section so that a surface of the upper panel is substantially flush with a surface of the base part.

11. An air deflector as defined in claim 8, wherein said upper panel has a ridge portion and a marker lamp mount section on the ridge portion, and wherein the marker lamp is positioned in a cavity or recess of the marker lamp mount section; and wherein a lens of the marker lamp has an outer edge profile matching with a frame of the mount section, and an outer peripheral edge of the lens is fixed to the frame.

12. An air deflector as defined in claim 1, wherein the upper part of said front face of the van body is substantially fully covered with the air deflector, as viewed from the front, whereby a stepped formation is substantially completely eliminated between the air deflector and the van body.

* * * * *